April 25, 1961 J. MATTERN 2,981,826
LIGHT EQUALIZING DEVICE
Filed Oct. 27, 1959

INVENTOR.
JOHN MATTERN

BY

*J. F. Sheehan*
ATTORNEY

United States Patent Office 2,981,826
Patented Apr. 25, 1961

2,981,826

LIGHT EQUALIZING DEVICE

John Mattern, Baltimore, Md., assignor, by mesne assignments, to the United States of America as represented by the Secretary of the Navy Filed Oct. 27, 1959, Ser. No. 849,127

2 Claims. (Cl. 240—1)

This invention relates to a light equalizing device and in particular concerns such a device which provides two separate light channels having equal intensities.

In the past, where photometric comparison tests were conducted requiring a light source of sufficient intensity, a considerable distance between the source and the light channels was needed to mitigate adverse effects of change of arc position within the light source and thus serving to unbalance the photometer. The space between the light source and the light channels was ordinarily enclosed by a reflecting tube of suitable length, but this arrangement, besides being incommodious, could not properly offset the unbalancing of the photometer due to changing arc positions.

It is therefore a broad object of this invention to provide a compact two-channel light equalizing device having constant relative illumination to each of the two channels from a distributed light source.

Another object of the invention is to provide a light equalizing device having a uniquely proportioned "light pipe" or solid light transmitting member capable of feeding two channels of a photometer with equal light intensities.

Other objects and advantages of the invention will become apparent upon reading the following description taken in conjunction with the accompanying drawings, wherein.

Figure 1:
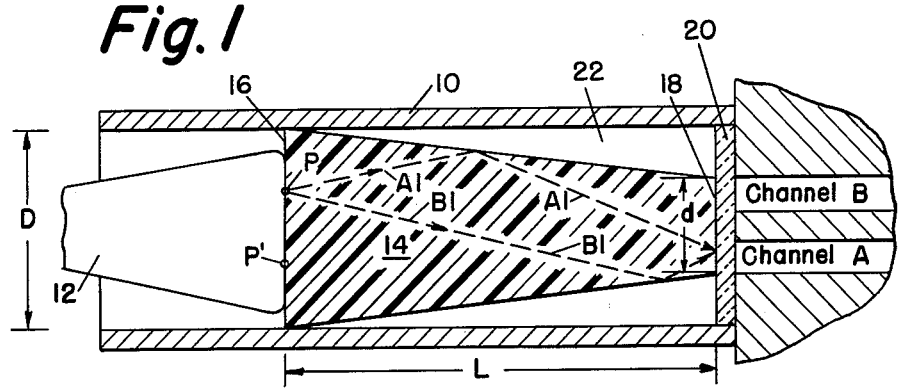
Fig. 1 is a sectional view of the device of the invention showing typical paths of indirect light to one of the channels.
Figure 2:
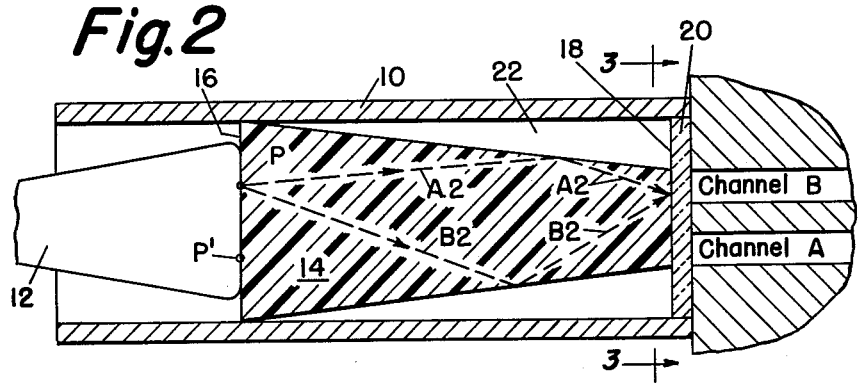
Fig. 2 is a view similar to Fig. 1, but showing typical paths of travel to the other channel.
Figure 3:
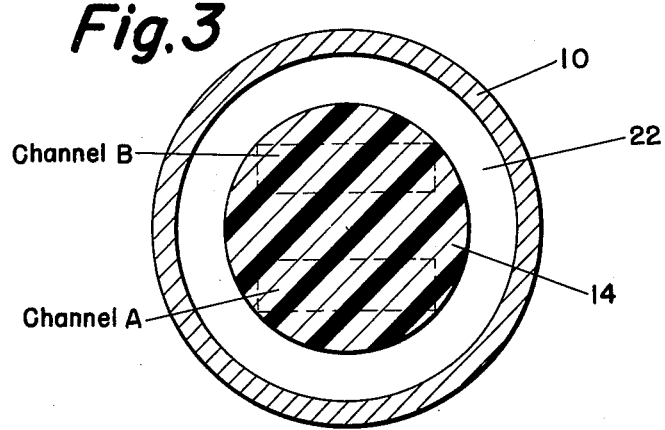
Fig. 3 is a transverse section taken along line 3—3 of Fig. 2 to show details of Figs. 1 and 2.

Referring to both Figs. 1 and 2 of the drawings, which are structurally similar, there is shown a short cylindrical housing 10 which may be made of reflecting metal and containing a light source, such, for example, as a fluorescent lamp 12 which extends into the cylinder through one of its open ends. A tapered light pipe 14, providing a solid light transmitting member of frusto-conical design, preferably of Plexiglas, and having a highly polished or optical surface, forms a light containing member which extends axially of the cylinder 10, the wider end 16 of the light pipe or major diameter end being aligned generally vertically with the emitting surface of lamp 12 while the narrow or minor diameter end 18 abuts the inner face of a light diffusing glass disk 20 and provides a converging surface or surfaces therebetween. It is to be understood that other materials, such, for example, as high refractive index glass may be used equally well. The disk 20 thus has its inner face aligned with or disposed in the same plane with the narrow end 18 of the light pipe while the major diameter end of the light pipe 16 is in the same general plane of the face of the light source. A pair of light channels, which may be rectangular as shown in Fig. 3, designated as channel A and channel B, are in communicating relation with the light source 12 through the tapered light pipe 14.

In Fig. 1 the major diameter of the tapered light pipe 14 is indicated at D, the minor diameter at d while the length of the tube is shown at L.

By way of explanation, direct light from a selected point P of the light source to channel B will always be slightly more intense than the direct light to channel A, since channel A is a greater distance from point P than channel B. This follows from the inverse-square law, which is to the effect that the intensity of illumination from a source varies inversely as the square of the distance from the source. To compensate for this light intensity unbalance, a tapered light pipe 14, having the general design of that in Figs. 1 and 2 and positioned axially within the cylindrical housing 10, receives all the light, direct and indirect, emanating from the source 12. Since the tapered light pipe is preferably of Plexiglas which has a critical reflection angle of 45°, any rays striking the Plexiglas at an angle greater than 45° from the perpendicular will be totally reflected, for example, as shown in Figs. 1 and 2.

It can be shown, from direct measurements, that the combined distances of the indirect ray paths A1 and B1 to channel A in Fig. 1 is less than the combined distances of the indirect ray paths A2 and B2 to channel B in Fig. 2, and thus, by virtue of the inverse-square law, the intensity of indirect light to channel A will always be slightly greater than the intensity of light being transmitted to channel B, and serves to compensate for the differences in the intensity of direct light.

It has been found experimentally, that by proper dimensioning of the tapered light pipe 14, proper direct and indirect light balance to the channels can be effected. To effect this light balance a definite relationship between the length, and major and the minor diameters is necessary. If the major diameter, D, is made 0.8 of the length L of the light pipe 14 and the minor diameter, d, is made 0.533 of the length L, proper balancing or equalizing of the light will be effected. Since the indirect light to each of the channels is transmited at varying angles, the diffusing disk 22 is positioned at the outlet end of the tapered light pipe 14.

Since light from point P produces equal illumination on A and B channels, light from another point, P', for example, selected at the lower half of the lamp 12 must necessarily have a similar effect. Thus, the distribution of light over the lamp's surface has little or no effect on balance.

It should be understood, of course, that the foregoing disclosure relates to a single embodiment of the invention only, and that other relative dimensions of the reflector tube may be found capable of providing the desired light balance.

What is claimed is:

1. An illuminating device comprising a cylindrical housing, a light source and a light diffuser within the housing providing a space therebetween, an elongate solid light conductor extending axially within said space, said conductor having tapering walls providing a large diameter end and a small diameter end with each of said ends presenting a generally flat transverse surface, said light source having an emitting face of substantial area disposed adjacent the large diameter transverse surface of the light conductor, said light diffuser comprising a glass disk having one face disposed adjacent the small diameter transverse surface of the light conductor and its other face communicating with a plurality of channels for directing light of equal intensity to each channel.

2. A device as in claim 1, further characterized by said light conductor being of frusto-conical design with its large diameter end being equal to 0.8 that of the length of the conductor and its small diameter end being equal to 0.533 that of the length of the conductor.

References Cited in the file of this patent

UNITED STATES PATENTS

| | | |
|---|---|---|
| 1,706,161 | Hollnagel | Mar. 19, 1929 |
| 1,800,277 | Boerstler | Apr. 14, 1931 |
| 1,965,865 | Thompson | July 10, 1934 |
| 2,196,166 | Bryce | Apr. 2, 1940 |
| 2,448,244 | Arnold | Aug. 31, 1948 |
| 2,640,144 | Levy | May 26, 1953 |
| 2,825,260 | O'Brien | Mar. 4, 1958 |

FOREIGN PATENTS

| | | |
|---|---|---|
| 285,738 | Great Britain | Feb. 15, 1928 |